(12) United States Patent
Pak et al.

(10) Patent No.: US 8,791,043 B2
(45) Date of Patent: Jul. 29, 2014

(54) ORDERED MESOPOROUS CARBON COMPOSITE CATALYST, METHOD OF MANUFACTURING THE SAME, AND FUEL CELL USING THE SAME

(75) Inventors: Chan-ho Pak, Seoul (KR); Hyuk Chang, Seongnam-si (KR); Ji-man Kim, Suwon-si (KR); Jeong-kuk Shon, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 417 days.

(21) Appl. No.: 12/650,750

(22) Filed: Dec. 31, 2009

(65) Prior Publication Data
US 2010/0167106 A1  Jul. 1, 2010

(30) Foreign Application Priority Data

Dec. 31, 2008 (KR) .................. 10-2008-0138718
Dec. 28, 2009 (KR) .................. 10-2009-0131848

(51) Int. Cl.
| | | |
|---|---|---|
| B01J 23/16 | (2006.01) | |
| B01J 23/44 | (2006.01) | |
| B01J 23/46 | (2006.01) | |
| B01J 23/75 | (2006.01) | |
| B01J 23/745 | (2006.01) | |
| B01J 23/755 | (2006.01) | |
| H01M 4/36 | (2006.01) | |
| C01B 31/00 | (2006.01) | |

(52) U.S. Cl.
USPC ........... 502/182; 502/185; 429/523; 429/525; 429/526; 429/527; 423/445 R

(58) Field of Classification Search
USPC .......... 429/523, 525, 526, 527; 502/182, 185; 423/445 R
See application file for complete search history.

(56) References Cited

U.S. PATENT DOCUMENTS

| | | | | |
|---|---|---|---|---|
| 6,585,948 B1 * | 7/2003 | Ryoo et al. | ................. | 423/445 R |
| 7,157,402 B2 * | 1/2007 | Yu et al. | ......................... | 502/101 |
| 7,220,697 B2 * | 5/2007 | Pak et al. | ...................... | 502/185 |

(Continued)

FOREIGN PATENT DOCUMENTS

| | | |
|---|---|---|
| JP | 2003-117398 | 4/2003 |
| KR | 1020030009097 A | 1/2003 |

(Continued)

OTHER PUBLICATIONS

Holister et al.; Cientifica, "Nanoporous Materials", Technology White Papers nr.5; Oct. 2003; 11 pages.*

(Continued)

*Primary Examiner* — Helene Klemanski
(74) *Attorney, Agent, or Firm* — Stein IP, LLC

(57) ABSTRACT

An ordered mesoporous carbon (OMC) composite catalyst includes an OMC; and metal particles and at least one component selected from a group consisting of nitrogen and sulfur included in the OMC. The ordered mesoporous carbon composite catalyst may be formed by impregnating an ordered mesoporous silica with a mixture of at least one selected from the group consisting of a nitrogen-containing carbon precursor, and a sulfur-containing carbon precursor, a metal precursor, and a solvent; drying and heat-treating the impregnated OMS; carbonizing the dried and heat-treated OMS to obtain a carbon-OMS composite; and removing the OMS from the carbon-OMS composite. A fuel cell may contain the OMC composite catalyst.

21 Claims, 10 Drawing Sheets

(56) References Cited

U.S. PATENT DOCUMENTS

| | | | |
|---|---|---|---|
| 7,670,582 B2 * | 3/2010 | Pak et al. | 423/445 R |
| 7,776,779 B2 * | 8/2010 | Joo et al. | 502/180 |
| 7,854,913 B2 * | 12/2010 | Joo et al. | 423/445 R |
| 7,867,941 B2 * | 1/2011 | Joo et al. | 502/174 |
| 8,043,595 B2 * | 10/2011 | Pak et al. | 423/445 R |
| 2002/0186582 A1 | 12/2002 | Sharma et al. | 365/158 |
| 2006/0116284 A1 | 6/2006 | Pak et al. | 502/180 |
| 2006/0166811 A1 | 7/2006 | Huang et al. | 502/101 |
| 2006/0194097 A1 * | 8/2006 | Kim et al. | 429/44 |
| 2006/0263288 A1 | 11/2006 | Pak et al. | 423/445 |
| 2007/0042268 A1 | 2/2007 | Pak et al. | 429/213 |
| 2007/0082253 A1 | 4/2007 | Zelenay et al. | 429/482 |
| 2007/0116624 A1 | 5/2007 | Joo et al. | 423/445 |
| 2007/0116625 A1 | 5/2007 | Joo et al. | 423/445 |
| 2007/0128501 A1 | 6/2007 | Alonso-Vante et al. | 429/483 |
| 2008/0160391 A1 * | 7/2008 | Joo et al. | 429/41 |
| 2009/0239115 A1 * | 9/2009 | Pak et al. | 429/30 |
| 2011/0136036 A1 * | 6/2011 | Miyata et al. | 429/479 |

FOREIGN PATENT DOCUMENTS

| | | |
|---|---|---|
| KR | 10-2005-0015492 | 2/2005 |
| KR | 10-2006-0039404 | 5/2006 |
| KR | 1020060040029 A | 5/2006 |
| KR | 100612896 B1 | 8/2006 |
| KR | 1020070021846 A | 2/2007 |
| KR | 100708730 | 4/2007 |
| KR | 100741078 B1 | 7/2007 |
| KR | 10-0751350 | 8/2007 |
| KR | 10-2008-0063196 | 7/2008 |
| WO | WO/99/39818 | 8/1999 |

OTHER PUBLICATIONS

N. Alonso-Vante, et al., *The structure analysis of the active centers of Ru-containing electrocatalysts for the oxygen reduction*. An in situ EXAFS study, Mar. 2002, 3807-3814.

Lingyun Liu, et al., *Development of ruthenium-based bimetallic electrocatalysts for oxygen reduction reaction*, Sep. 2006, 1099-1103.

Dianxue Cao, et al., *Oxygen Reduction Reaction on Ruthenium and Rhodium Nanoparticles Modified with Selenium and Sulfur*, Mar. 2006, A869-A874.

L. Colmenares, et al., *Activity, Selectivity, and Methanol Tolerance of Se-Modified Ru/C Cathode Catalysts*, Dec. 2006, 1273-1283.

Lingyun Liu, et al., *Development of Ruthenium-Based Catalysts for Oxygen Reduction Reaction*, Dec. 2006, A123-A128.

Zhibin Lei, et al., *Highly dispersed platinum supported on nitrogen-containing ordered mesoporous carbon for methanol electrochemical oxidation*, ScienceDirect, Available online Oct. 2, 2008, pp. 30-38.

Sang Hoon Joo, et al., *Ordered mesoporous carbons (OMC) as supports of electrocatalysts for direct methanol fuel cells (DMFC): Effect of carbon precursors of OMC on DMFC performances*, ScienceDirect, Available online May 15, 2006, pp. 1618-1626.

European Search Report dated Sep. 4, 2012, issued in International Application No. 09180758.6-1227/2204237.

Hyung Ik Lee et al., "*Ultrastable Pt nanoparticles supported on sulfur-containing ordered mesoporous carbon via strong metal-support interaction*" (Journal of Materials Chemistry, vol. 19, No. 33), Received Apr. 15, 2009, Accepted Jun. 18, 2009, First published as an Advance Article on the web Jul. 23, 2009, pp. 5934-5939.

* cited by examiner

US 8,791,043 B2

ORDERED MESOPOROUS CARBON COMPOSITE CATALYST, METHOD OF MANUFACTURING THE SAME, AND FUEL CELL USING THE SAME

CROSS-REFERENCE TO RELATED APPLICATION

This application claims the benefit of Korean Patent Application Nos. 10-2008-0138718, filed on Dec. 31, 2008, and 10-2009-0131848, filed on Dec. 28, 2009, in the Korean Intellectual Property Office, the disclosure of which is incorporated herein in its entirety by reference.

BACKGROUND

1. Field

One or more embodiments relate to an ordered mesoporous carbon composite catalyst, a method of manufacturing the same, and a fuel cell using the same.

2. Description of the Related Art

A polymer electrolyte membrane fuel cell (PEMFC) or a direct methanol fuel cell (DMFC) is a power generating system that generates direct current (DC) electricity from an electrochemical reaction of hydrogen or methanol, and oxygen, and has a structure where an anode, a proton conductive membrane, and a cathode are sequentially stacked in the order stated, wherein a reaction liquid/gas is supplied to the anode and the cathode.

In the anode, catalysts generate protons by oxidizing hydrogen or methanol. The generated protons pass through the proton conductive membrane and react with oxygen by catalysts in the cathode, thereby generating electricity. The function of a catalyst is important in a fuel cell having such a structure.

In the PEMFC, Pt particles dispersed in an amorphous carbon support are used for both the anode and the cathode, and in the DMF, PtRu is used for the anode and Pt particles or Pt particles dispersed in an amorphous carbon support are used for the cathode.

The amount of a catalyst used may be reduced in order to obtain price competitiveness of a fuel cell. Accordingly, studies relating to developing a catalyst that does not use Pt at all are being actively conducted.

However, non-platinum catalysts that have been developed until the present day do not show sufficient activity.

SUMMARY

One or more embodiments include a catalyst having improved activity, a method of manufacturing the same, and a fuel cell using the same.

Additional aspects will be set forth in part in the description which follows and, in part, will be apparent from the description, or may be learned by practice of the presented embodiments.

To achieve the above and/or other aspects, one or more embodiments may include an ordered mesoporous carbon (OMC) composite catalyst comprising: an OMC; and metal particles and at least one component selected from a group consisting of nitrogen (N) and sulfur (S) included in the OMC.

To achieve the above and/or other aspects, one or more embodiments may include a method of manufacturing a carbon composite catalyst, the method including: impregnating an ordered mesoporous silica (OMS) with a mixture of at least one selected from the group consisting of a nitrogen-containing carbon precursor, and sulfur-containing carbon precursor, a metal precursor, and a solvent; drying and heat-treating the impregnated OMS; carbonizing the dried and heat-treated OMS to obtain a carbon-OMS composite; and removing the OMS from the carbon-OMS composite to obtain the carbon composite catalyst.

To achieve the above and/or other aspects, one or more embodiments may include an ordered mesoporous carbon composite catalyst and which is manufactured according to the method above.

To achieve the above and/or other aspects, one or more embodiments may include a fuel cell including: a cathode; an anode; and an electrolyte disposed between the cathode and the anode, wherein at least one of the cathode and the anode includes an OMC composite catalyst for oxygen reduction reaction, comprising: OMC; and metal particles included in the OMC and at least one of nitrogen (N) and sulfur (S).

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings.

An ordered mesoporous carbon (OMC) composite catalyst according to an embodiment and includes an OMC having mesopores, a transition metal included in the OMC, and nitrogen or sulfur, or both nitrogen and sulfur. In the OMC composite catalyst, metal particles such as ruthenium particles, and nitrogen and/or sulfur are uniformly dispersed in an OMC structure. A mutual synergy effect is generated, since nitrogen and sulfur are coordinated near the metal particles, such as ruthenium particles, and the supplying of oxygen and discharging of water are smoothly performed by using the mesopores and structural regularity of the OMC.

The transition metal may be at least one of ruthenium, palladium, iridium, iron, cobalt, molybdenum, and nickel.

The mesopores of the OMC composite catalyst have an average diameter of about 6 to about 10 nm, and the OMC composite catalyst has a specific surface area of about 500 to about 1200 m$^2$/g, and a pore volume of about 1.2 to about 1.8 m$^2$/g. Also, an average particle size of metal particles dispersed in the OMC composite catalyst is about 1 to about 50 nm.

When the average diameter, the specific surface area, and the pore volume of the mesopores, and the average particle size of the metal particles are within the above range, the activity of the OMC composite catalyst is excellent. In an OMC composite catalyst according to an embodiment, since a metal is dispersed in an OMC having mesopores and including at least one component selected from a group consisting of nitrogen and sulfur, the supply of a reactant or diffusion of a product is convenient. Also, when sulfur is included in the OMC, the stability of metal particles increases since sulfur has excellent interaction with and coherence to the metal particles, and thus, the initial activity of the OMC composite catalyst is maintained. In addition, agglomeration of the metal particles during a high temperature operation or a long operation is effectively suppressed.

The metal may be at least one of ruthenium, palladium, iridium, iron, cobalt, molybdenum, and nickel.

Figure 1A:
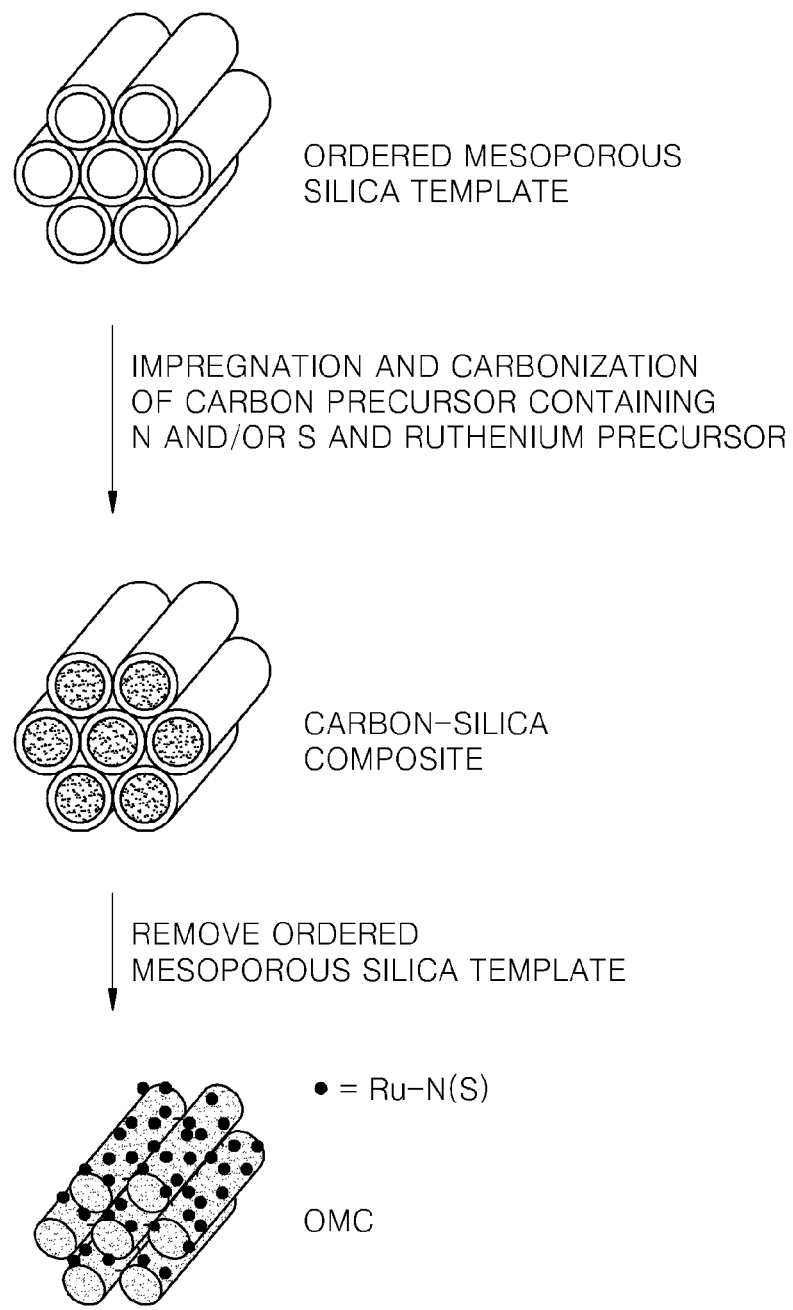
FIG. 1A is a schematic diagram illustrating a process of forming an ordered mesoporous carbon composite catalyst, according to an embodiment.

FIG. 1A is a schematic diagram illustrating a method of forming an OMC composite catalyst, according to an embodiment. In FIG. 1A, a ruthenium precursor is used as an embodiment of a transition metal precursor.

Referring to FIG. 1A, a carbon-silica composite is formed by adding at least one of a nitrogen-containing carbon precursor and a sulfur-containing carbon precursor (carbonization catalyst), a metal precursor, and a solvent to an ordered mesoporous silica (OMS) template as a nano template, and then drying, heat-treating, and carbonizing the resultant. Here, the OMS template has an X-ray diffraction peak of below 2° since pores are regularly arranged in the OMS. Then, the OMS template is removed from the carbon-silica composite so as to obtain the OMC composite catalyst according to the current embodiment.

Figure 1B:
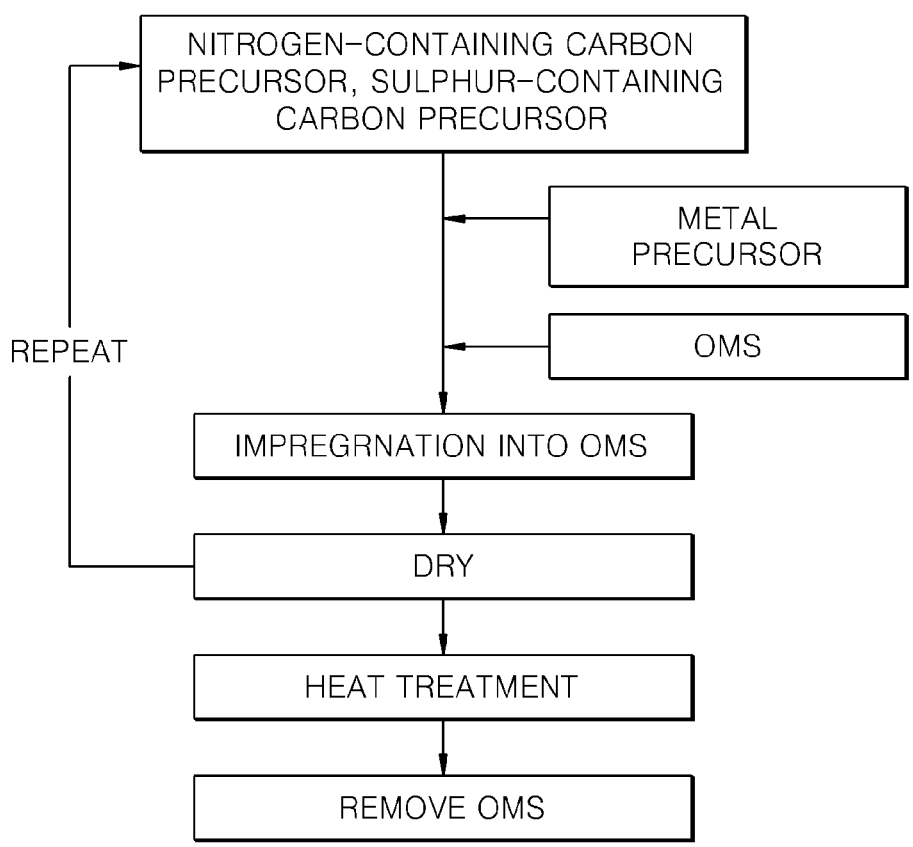
FIG. 1B is a diagram illustrating a method of manufacturing an ordered mesoporous carbon composite catalyst, according to an embodiment.

FIG. 1B is a diagram illustrating a method of manufacturing an OMC composite catalyst, according to an embodiment.

A precursor mixture is obtained by mixing at least one of a nitrogen-containing carbon precursor and a sulfur-containing carbon precursor, a metal precursor, and a solvent.

The nitrogen-containing carbon precursor may be at least one selected from a group consisting of quinoxaline, propylenediamine, 4,4-dipyridyl and phenanthroline.

The sulfur-containing carbon precursor may function as a carbonization catalyst in addition to being a carbon precursor. An example of the sulfur-containing carbon precursor includes para-toluene sulfonic acid.

When the sulfur-containing carbon precursor and the nitrogen-containing carbon precursor are simultaneously used, the amount of the sulfur-containing carbon precursor may be about 30 to about 90 parts by weight based on 100 parts by weight of the nitrogen-containing carbon precursor.

The metal precursor may be at least one selected from a group consisting of ruthenium chloride, molybdenum chloride, iron chloride, and cobalt chloride, and the amount of the metal precursor may be about 20 to about 120 parts by weight based on 100 parts by weight of the nitrogen-containing carbon precursor.

The solvent may be any solvent that uniformly dissolves the nitrogen-containing carbon precursor, the sulfur-containing carbon precursor, and the metal precursor. Examples of the solvent include water, acetone, methanol, ethanol, isopropyl alcohol, n-propyl alcohol, butanol, dimethyl acetamide, dimethyl formamide, dimethyl sulfoxide, N-methyl-2-pyrrolidone, tetrahydrofuran, tetrabutyl acetate, n-butyl acetate, m-cresol, toluene, ethylene glycol, gamma butyrolactone, and hexafluoroisopropanol (HFIP). The solvents may be used alone or in combination.

The precursor mixture prepared as above is impregnated in an OMS, dried, heat treated, and carbonized, so as to prepare a carbon-silica composite.

The OMS is a molecular sieve material having a structure in which 1-dimensional (1D) pores are connected to micropores, although the structure is not limited thereto. The OMS may also be a molecular sieve material having a 3D connection structure, such as, for example, MCM-48 having a cube structure, SBA-1 having another cube structure, SBA-15 having a hexagonal structure, or KIT-1 and MSU-1 having a structure where pores are irregularly connected in 3D. Additional examples of the molecular sieve material include various ordered mesoporous molecular sieve materials having a structure in which long directional 1D pores are connected to the micropores.

The amount of OMS into which the precursor mixture is impregnated may be about 0.5 to about 30 parts by weight based on 100 parts by weight of the precursor mixture. When the amount of OMS is within the above range, a carbon structure may be sufficiently formed in the silica pores.

The temperature of the impregnation is not limited, and may be room temperature (about 20° C. to about 25° C.).

After the impregnation, the impregnated precursor mixture may be dried, if desired. The temperature of the drying is not limited, and may be room temperature. For quick drying, the impregnated precursor mixture may be dried in a decompressed atmosphere.

The heat treatment may be performed at about 50 to about 400° C. When the temperature is within the above range, uniformity of the OMC is excellent.

The heat-treated resultant may be directly carbonized, but, as an alternative, the above processes may be repeated 2 to 10 times. In other words, the heat-treated resultant may be impregnated with the precursor mixture, and then, heat-treated as above. This process may be further repeated or carbonization may be performed. When the heat-treated resultant is directly carbonized without repeating the above processes, a carbon structure may not be completely formed in the pores of the OMS, and when the above processes are repeated more than 10 times, further repetitions may not provide improvement.

As described above, the heat-treated resultant is carbonized. In other words, the precursor mixture impregnated in the OMS is graphitized via the carbonization. The carbonization is performed by further heat-treating the heat-treated resultant at about 600 to about 1500° C. by heating, such as in an electric furnace. When the temperature of the carbonization is within the above range, the graphitization and carbonization are smoothly performed. The carbonization may be performed in a non-oxidizing atmosphere. The non-oxidizing atmosphere may be one of a vacuum atmosphere, a nitrogen atmosphere, and an inert gas atmosphere.

Then, the OMS is removed from the carbon-silica composite obtained as above by using a solvent that selectively dissolves the OMS.

Examples of the solvent that selectively dissolves the OMS include a hydrofluoric acid (HF) aqueous solution and a sodium hydroxide (NaOH) aqueous solution. The concentration of the HF aqueous solution may be about 5 to about 47 wt %, and the concentration of the NaOH aqueous solution may be about 5 to about 30 wt %.

The OMS turns into a soluble silicate via alkali melting or carbonate fusion, and is known to form $SiF_4$, which easily erodes by reacting with HF. An OMC composite catalyst is prepared by selectively removing the OMS.

The OMC composite catalyst obtained as above includes uniformly arranged pores, as confirmed from an X-ray diffraction analysis.

In the OMC composite catalyst, the amount of metal particles may be about 0.05 to about 0.45 parts by weight, for example about 0.1 to about 0.3 parts by weight, based on 1 part by weight of the OMC. When the amount of metal particles is within the above range, activity of the OMC composite catalyst is excellent. Also in the OMC composite catalyst, the amount of at least one of sulfur and nitrogen may be about 0.005 to about 0.1 parts by weight based on 1 part by weight of the OMC.

When the amount of the at least one of sulfur and nitrogen is within the above range, the activity of the OMC composite catalyst is excellent. When the OMC composite catalyst includes both sulfur and nitrogen, a mixed atomic ratio of nitrogen to sulfur is from about 1:3 to about 9:1. For example, the mixed atomic ratio of nitrogen to sulfur is from about 4.14:1 to about 4.75:1.

When the OMC composite catalyst includes both sulfur and nitrogen, an atomic ratio of the sum total of nitrogen and sulfur with respect to the metal particles is from about 3.75 to about 4.54. Here, an atomic ratio of nitrogen with respect to the metal particles is from about 3.03 to about 3.75, and an atomic ratio of sulfur with respect to the metal particles is 0.73:0.79.

When the OMC composite catalyst contains only sulfur, an atomic ratio of sulfur with respect to the metal particles is about 0.96.

The metal particles may be ruthenium.

Unlike an amorphous microporous carbon powder only having micropores, the OMC composite catalyst according to the current embodiment includes micropores and mesopores in a suitable ratio. Here, according to a definition of the International Union of Pure and Applied Chemistry (IUPAC), a micropore has a diameter below about 2 nm, and a mesopore has a diameter of about 2 to about 50 nm.

An average diameter of pores of the OMC composite catalyst is about 6 to about 10 nm. Since the average diameter of the pores of the OMC composite catalyst is larger than an average diameter of pores of a general OMC, i.e., about 3 to less than 5 nm, the OMC composite catalyst easily transmits materials.

A full width at half maximum (FWHM) pore size distribution using a nitrogen absorption characteristic may be 5 nm or lower, or more specifically, about 1 to about 4.5 nm, in the OMC composite catalyst. Here, an average diameter and distribution characteristics of mesopores may be measured by using Tristar 3000 analyzer by Micromeritics. The distribution characteristics of mesopores may be calculated from a nitrogen absorption curve by using a Barrett-Joyner-Halenda (BJH) method, wherein the average diameter is the largest value from a peak having the largest strength from among peaks in the distribution characteristics of the mesopores.

The FWHM is calculated by fitting a peak having the largest strength in the distribution characteristics of mesopores by using a generally used mathematical model (Lorentzian or Gaussian).

A BET specific surface area according to ordered mesopores forming the OMC composite catalyst may be about 500 to about 1200 $m^2/g$.

When the average diameter of the mesopores of the OMC composite catalyst is within the above range, the OMC composite catalyst is easily prepared without deterioration of the activity of the OMC composite catalyst.

Also, when the BET specific surface area is within the above range, catalyst efficiency is excellent.

Since the pores of an ordered mesoporous carbon composite are uniformly arranged, a major peak of Bragg's 2θ angle to CuK-alpha characteristic X-ray wavelength 1.541 Å is located at about 0.5° to about 1.2°.

Also, in the OMC composite catalyst according to an embodiment, a sub-peak of Bragg's 2θ angle to a CuK-alpha characteristic X-ray wavelength 1.541 Å is displayed about 1.21° to about 3°.

A structure (space group) of the OMC may be determined by analyzing the locations of such peaks. The major peak and sub-peak are determined by the intensity of the peak.

As used herein, in a phrase such as "located between about A° and about B°," it is to be understood that the endpoints A and B are included.

It is possible to analyze the amount of each component forming the OMC composite catalyst via energy dispersive x-ray (EDX) analysis.

According to an embodiment, the amount of ruthenium as a metal may be from 10±1 wt % to 30±3 wt %, the amount of nitrogen (N) may be 5±2 wt %, and the amount of sulfur may be 2±1 wt %, based on a result of EDX analyzing the ordered mesoporous transition metal carbon composite.

The OMC composite catalyst manufactured as described above includes ruthenium-nitrogen and ruthenium-sulfur components that may be used as an oxygen reduction catalyst, and has uniform mesopores that may increase the supply and diffusion of a reactant and a product. Accordingly, catalyst activity for oxygen reduction increases when the OMC composite catalyst is used.

The OMC composite catalyst may be used in home fuel cells or portable fuel cells for mobile devices, such as laptops, mobile phones, and in cars or buses.

A fuel cell using the OMC composite catalyst, according to an embodiment will now be described.

The fuel cell includes a cathode, an anode, and an electrolyte film disposed between the cathode and the anode. Here, at least one of the cathode and the anode includes the OMC composite catalyst according to the embodiment described above.

Catalyst activity of the fuel cell using the OMC composite catalyst is maintained even when the fuel cell is operated for a long time or at a high temperature.

As non-limiting examples, the fuel cell may be a PEMFC or a DMFC. The structure and method of manufacturing the fuel cell are not limited, and examples thereof are disclosed in various documents, and thus, details thereof are omitted herein.

Examples will now be described for illustrative purposes, however the embodiments are not limited thereto.

Example 1A

Preparation of Ordered Mesoporous Carbon Composite Catalyst Including Nitrogen and Sulfur (Quinoxaline is Used as Nitrogen-Containing Precursor, and Amount of Ruthenium is 0.1 Parts by Weight Based on 1 Part by Weight of OMC that Forms Ordered Mesoporous Transition Metal Carbon Composite)

An impregnation process was performed on a ruthenium precursor twice.

A first ruthenium precursor solution was prepared as follows.

As a nitrogen-containing carbon precursor, 0.512 g of quinoxaline (purity 99%) based on 1 g of MSU-H used as an OMS template was used. 0.150 g of ruthenium chloride was used as a ruthenium precursor, wherein the amount of ruthenium is 0.1 parts by weight based on 1 part by weight of the synthesized OMC. The nitrogen-containing carbon precursor and the ruthenium precursor were mixed to prepare a mixture.

The first ruthenium precursor solution was prepared by mixing and completely dissolving 0.96 g of distilled water and 0.337 g of para-toluene sulfonic acid constituting a sulfur-containing carbon precursor and a carbonization catalyst in the above mixture.

A second ruthenium precursor solution was prepared in the same manner as the first ruthenium precursor solution, except that 70% of the amount of the first ruthenium precursor solution was used.

A first impregnation process was performed by putting OMS, which is used as a template and the first ruthenium precursor solution prepared above in a teflon bottle and shaking the teflon bottle. The mixture inside the teflon bottle was dried and reacted in an oven at 160° C. for 6 hours in order to form an oligomer. The color of the mixture darkened as time passed.

The resultant was cooled down at room temperature, and then, a second impregnation process was performed by using the second ruthenium precursor solution. Then, the impregnated resultant was reacted in the oven at 160° C. for 6 hours. If the impregnated resultant is reacted for too long, a carbon precursor evaporates too much, and thus, about 6 hours are suitable.

The composite power obtained as above was carbonized at 900° C. under a nitrogen gas atmosphere. Here, the temperature was increased up to 900 for 5 hours, and maintained constant at 900° C. for 2 hours.

The resultant was processed by using a HF solution so as to remove the OMS. Accordingly, an OMC composite catalyst {Ru—N—S—OMC} was obtained.

Example 1B

Preparation of Ordered Mesoporous Carbon Composite Catalyst Including Nitrogen and Sulfur (Quinoxaline is Used as Nitrogen-Containing Precursor, and Amount of Ruthenium is 0.2 Parts by Weight Based on 1 Part by Weight of OMC)

OMC composite catalyst {Ru—N—S—OMC} having different amount of ruthenium was prepared in the same manner as Example 1A above, except that 0.337 g of ruthenium chloride were used so that the amount of ruthenium was 0.2 parts by weight based on 1 part by weight of the OMC synthesized while preparing the first ruthenium precursor solution.

Example 1C

Preparation of Ordered Mesoporous Carbon Composite Catalyst Including Nitrogen and Sulfur (Quinoxaline is Used as Nitrogen-Containing Precursor, and Amount of Ruthenium is 0.3 Parts by Weight Based on 1 Part by Weight of OMC)

OMC composite catalyst {Ru—N—S—OMC} having different amount of ruthenium was prepared in the same manner as Example 1A above, except that 0.557 g of ruthenium chloride were used so that the amount of ruthenium was 0.3 parts by weight based on 1 part by weight of the OMC synthesized while preparing the first ruthenium precursor solution.

Example 2A

Preparation of OMC Composite Catalyst Including Nitrogen and Sulfur (Propylene Diamine is Used as Nitrogen-Containing Carbon Precursor)

An OMC composite catalyst {Ru—N—S—OMC} was prepared in the same manner as Example 1A, except that 0.871 g of propylene diamine was used instead of 0.512 g of quinoxaline as the nitrogen-containing precursor.

Example 2B

Preparation of OMC Composite Catalyst Including Nitrogen and Sulfur (Propylene Diamine is Used as Nitrogen-Containing Carbon Precursor)

OMC composite catalyst {Ru—N—S—OMC} having different amount of ruthenium was [e] prepared in the same manner as Example 2A above, except that 0.337 g of ruthenium chloride were used so that the amount of ruthenium was 0.2 parts by weight based on 1 part by weight of the OMC synthesized while preparing the first ruthenium precursor solution.

Example 2C

Preparation of OMC Composite Catalyst Including Nitrogen and Sulfur (Propylene Diamine is used as Nitrogen-Containing Carbon Precursor)

OMC composite catalyst {Ru—N—S—OMC} having different amount of ruthenium was prepared in the same manner as Example 2A above, except that 0.577 g of ruthenium chloride were used so that the amount of ruthenium was 0.3 parts by weight based on 1 part by weight of the OMC synthesized while preparing the first ruthenium precursor solution.

Example 3A

Preparation of OMC Composite Catalyst Including Sulfur (Para-Toluene Sulfonic Acid is Used as Sulfur-Containing Carbon Precursor)

An OMC composite catalyst {Ru—S—OMC} was prepared in the same manner as Example 1A, except that the first ruthenium precursor solution and the second ruthenium precursor solution are prepared as below.

The first ruthenium precursor solution was prepared by preparing a para-toluene sulfonic acid aqueous solution by completely mixing and dissolving 0.96 g of distilled water and 0.810 g of para-toluene sulfonic acid constituting a sulfur-containing carbon precursor and a carbonization catalyst, and then mixing the para-toluene sulfonic acid aqueous solution with 0.281 g of ruthenium chloride constituting a ruthenium precursor so that the amount of ruthenium is 0.1 part by weight based on 1 part by weight of the OMC.

The second ruthenium precursor is prepared in the same manner as the first ruthenium precursor solution, except that 70% of the amount of the first ruthenium precursor solution was used.

Example 3B

Preparation of OMC Composite Catalyst Including Sulfur (Para-Toluene Sulfonic Acid is Used as Sulfur-Containing Carbon Precursor)

OMC composite catalyst {Ru—S—OMC} having different amount of ruthenium was prepared in the same manner as Example 3A above, except that 0.634 g of ruthenium chloride were used so that the amount of ruthenium was 0.2 parts by weight based on 1 part by weight of the OMC synthesized while preparing the first ruthenium precursor solution.

Example 3C

Preparation of OMC Composite Catalyst Including Sulfur (Para-Toluene Sulfonic Acid is Used as Sulfur-Containing Carbon Precursor)

OMC composite catalyst {Ru—S—OMC} having different amount of ruthenium was prepared in the same manner as Example 3A above, except that 1.09 g of ruthenium chloride were used so that the amount of ruthenium was 0.3 parts by weight based on 1 part by weight of the OMC synthesized while preparing the first ruthenium precursor solution.

Example 4

Preparation of OMC Composite Catalyst Including Nitrogen and Sulfur

OMC composite catalyst {Mo—N—S—OMC} was prepared in the same manner as Example 1A above, except that 0.323 g of molybdenum chloride was used instead of 0.150 g of ruthenium chloride while preparing the first and second ruthenium precursor solution.

Example 5

Preparation of OMC Composite Catalyst Including Nitrogen and Sulfur

OMC composite catalyst {Fe—N—S—OMC} was prepared in the same manner as Example 1A above, except that 0.283 g of iron chloride was used instead of 0.150 g of ruthenium chloride while preparing the first and second ruthenium precursor solution.

Example 6

Preparation of OMC Composite Catalyst Including Nitrogen and Sulfur

OMC composite catalyst {Co—N—S—OMC} was prepared in the same manner as Example 1A above, except that 0.238 g of ruthenium chloride was used instead of 0.150 g of ruthenium chloride and 0.871 g of propylene diamine was used instead of 0.512 g of quinoxaline while preparing the first and second ruthenium precursor solution.

Example 7

Preparation of OMC Composite Catalyst Including Nitrogen and Sulfur

OMC composite catalyst {RuFe—N—S—OMC} was prepared in the same manner as Example 1A above, except that 0.150 g of ruthenium chloride and 0.234 g of ferric nitrate (II) were used instead of 0.150 g of ruthenium chloride, while preparing the first and second ruthenium precursor solution.

Example 8

Preparation of OMC Composite Catalyst Including Nitrogen and Sulfur

OMC composite catalyst {RuCo—N—S—OMC} was prepared in the same manner as Example 1A above, except that 0.150 g of ruthenium chloride and 0.070 g of cobalt chloride were used instead of 0.150 g of ruthenium chloride and 0.871 g of propylene diamine was used instead of 0.512 g of quinoxaline as a nitrogen-containing precursor while preparing the first and second ruthenium precursor solution.

Example 9A

Preparation of OMC Composite Catalyst Including Nitrogen (Propylene Diamine is Used as Nitrogen-Containing Carbon Precursor)

An OMC composite catalyst {Ru—N—OMC} was prepared in the same manner as Example 1A, except that the first ruthenium precursor solution and the second ruthenium precursor solution are prepared as below.

The first ruthenium precursor solution was prepared by preparing a mixture by completely mixing and dissolving 0.96 g of distilled water and 0.34 g of nitric acid constituting a nitrogen-containing carbon precursor and a carbonization catalyst, and then mixing the mixture with 0.150 g of ruthenium chloride constituting a ruthenium precursor so that the amount of ruthenium is 0.1 part by weight based on 1 part by weight of the OMC.

The second ruthenium precursor is prepared in the same manner as the first ruthenium precursor solution, except that 70% of the amount of the first ruthenium precursor solution was used.

Example 9B

Preparation of OMC Composite Catalyst Including Nitrogen (Propylene Diamine is Used as Nitrogen-Containing Carbon Precursor)

OMC composite catalyst {Ru—N—OMC} having different amount of ruthenium was prepared in the same manner as Example 3A above, except that 0.337 g of ruthenium chloride were used so that the amount of ruthenium was 0.2 parts by weight based on 1 part by weight of the OMC synthesized while preparing the first ruthenium precursor solution.

Example 9C

Preparation of OMC Composite Catalyst Including Nitrogen (Propylene Diamine is Used as Nitrogen-Containing Carbon Precursor)

OMC composite catalyst {Ru—N—OMC} having different amount of ruthenium was prepared in the same manner as Example 3A above, except that 0.577 g of ruthenium chloride were used so that the amount of ruthenium was 0.3 parts by weight based on 1 part by weight of the OMC synthesized while preparing the first ruthenium precursor solution.

Comparative Example 1

Preparation of OMC Catalyst Supported by Ruthenium (when the Amount of Ruthenium is 0.1 Parts by Weight Based on 1 Part by Weight of OMC)

A carbon precursor undergoes an impregnation process twice.

First, a first carbon precursor solution was prepared as follows.

1.25 g of sucrose (reagent grade) based on 1 g of MSU-H used as an OMS template was used as a carbon precursor. The carbon precursor was mixed and completely dissolved in 0.96 g of distilled water and 0.264 g of sulfuric acid used as a carbonization catalyst.

70% of the amount of the first carbon precursor solution was used as a second carbon precursor impregnation solution.

OMS used as a template and the carbon precursor were put into a Teflon bottle, and the Teflon bottle was shaken in order to perform a first impregnation process. Then, the mixture was dried and reacted at 100° C. for 6 hours and at 160° C. for 6 hours in order to form an oligomer. As time passed, the color of the mixture darkened.

The resultant was cooled down at room temperature, and then, a second impregnation process was performed on the cooled down resultant by using the second carbon precursor solution. Then, the resultant was reacted at 100° C. for 6 hours and at 160° C. for 6 hours.

A composite powder prepared as above was carbonized at 900° C. under a nitrogen gas atmosphere. Here, the temperature was increased up to 900° C. for 5 hours and maintained at 900° C. for 2 hours.

The resultant was processed by using an HF solution so as to remove the OMS, and thus, an OMC composite was obtained.

In order to add ruthenium to the OMC composite, 0.288 g of ruthenium chloride was dissolved in 1 g of ethanol, and then, 1 g of ordered mesoporous carbon was impregnated in an ethanol solution of ruthenium chloride. Then, the mixture was completely dried at 80° C. in an oven.

The resultant was heat-processed by increasing the temperature up to 200 for 5 hours, maintaining 200° C. for 2 hours in a hydrogen atmosphere, and increasing the temperature up to 350° C. for 30 minutes, and then, maintaining 350° C. for 3 hours. Accordingly, the OMC with Ru {Ru/OMC} was prepared.

Comparative Example 2

Preparation of OMC Catalyst Supported by Ruthenium (when the Amount of Ruthenium is 0.2 Parts by Weight Based on 1 Part by Weight of OMC)

OMC catalyst with Ru {Ru/OMC} having different amount of ruthenium was prepared in the same manner as Comparative Example 1, except that 0.646 g of ruthenium chloride was used so that the amount of ruthenium was 0.2 parts by weight based on 1 part by weight of the OMC synthesized in order to add ruthenium to the OMC.

Comparative Example 3

Preparation of OMC Catalyst Supported by Ruthenium (when the Amount of Ruthenium is 0.3 Parts by Weight Based on 1 Part by Weight of OMC)

OMC catalyst with Ru {Ru/OMC} having different amount of ruthenium was prepared in the same manner as Comparative Example 1, except that 1.109 g of ruthenium chloride was used so that the amount of ruthenium was 0.3 parts by weight based on 1 part by weight of the OMC synthesized in order to add ruthenium to the OMC.

Figure 2:
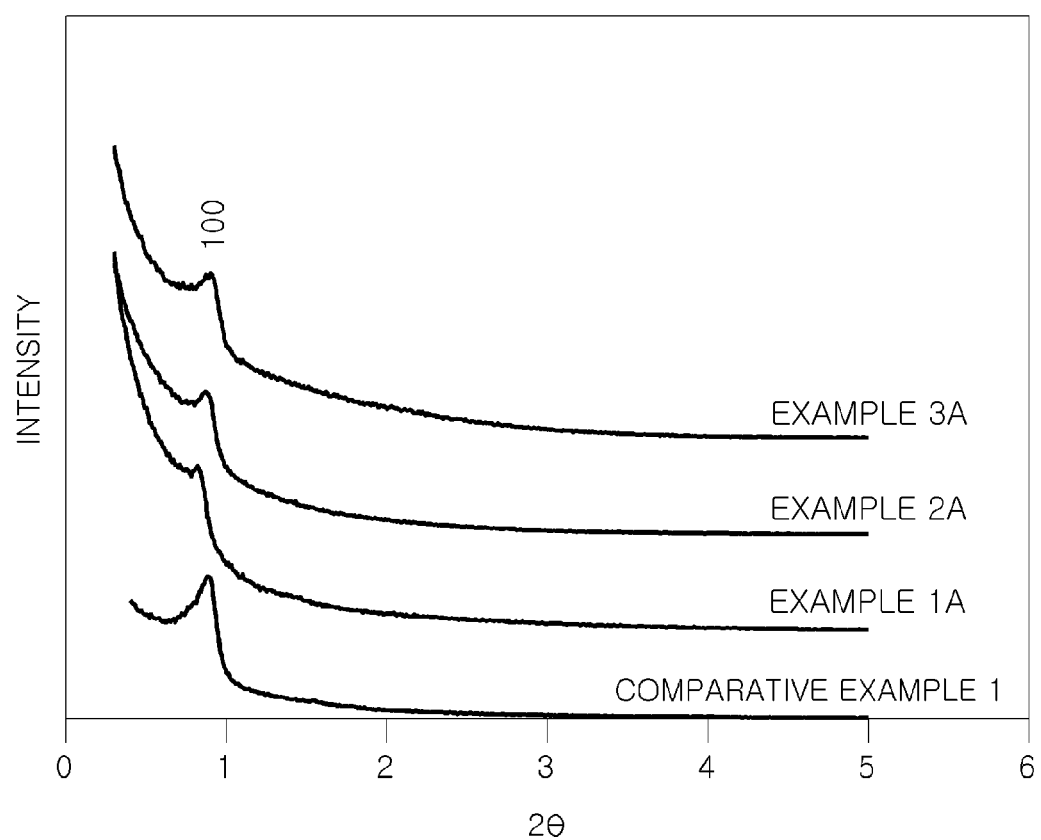
FIG. 2 is a graph showing results of X-ray Diffraction (XRD) analysis of ordered mesoporous carbon composite catalysts manufactured according to Examples 1A, 2A, 3A, and Comparative Example 1.

FIG. 2 is a graph showing results of X-ray Diffraction (XRD) analysis of OMC composite catalysts manufactured according to Examples 1A, 2A, 3A, and Comparative Example 1. FIG. 2 illustrates a result of small-angle XRD analysis.

Referring to FIG. 2, a major peak of Bragg's 2θ angle to CuK-alpha characteristic X-ray wavelength 1.541 Å is displayed about 0.5° to about 1.2°.

Also, based on FIG. 2, it is seen that the OMC composite catalysts prepared according to Examples 1A, 2A, and 3A have structural regularity with mesoporous regime.

Figure 3:
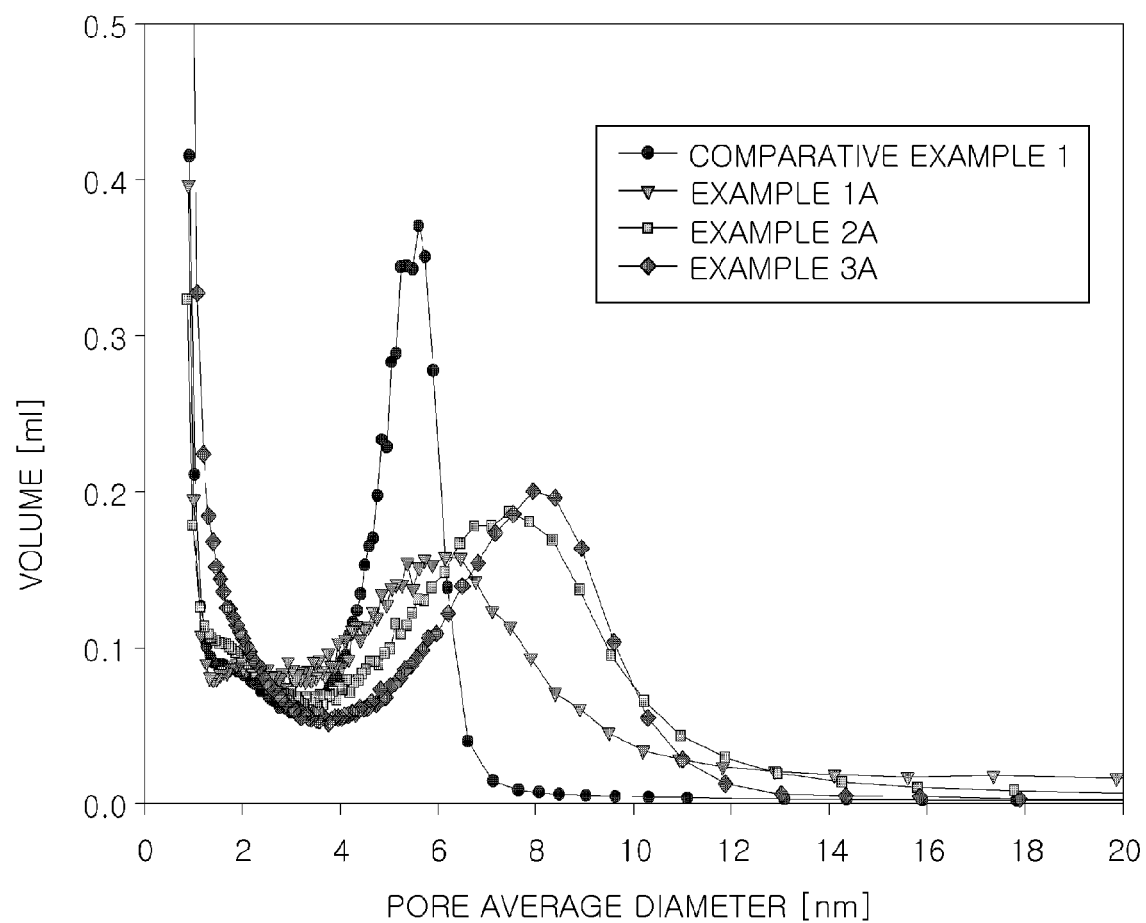
FIG. 3 is a graph showing pore size distribution of ordered mesoporous carbon composite catalysts according to Examples 1A, 2A, and 3A and Comparative Example 1.

FIG. 3 is a graph showing the pore size distribution of the OMC ruthenium composite catalysts according to Examples 1A, 2A, and 3A, and Comparative Example 1.

Also, Table 1 below shows BET surface areas, pore volumes, and average diameter of pores of the OMC composite catalysts of Examples 1A, 2A, 3A, and 9A, and Comparative Example 1.

TABLE 1

|  | BET Surface Area ($m^2/g$) | Pore Volume ($cm^3/g$) | Average Diameter of Pores (nm) |
| --- | --- | --- | --- |
| Example 1A | 910 | 1.25 | 6.0 |
| Example 2A | 955 | 1.60 | 7.5 |
| Example 3A | 1064 | 1.55 | 8.0 |
| Example 9A | 1138 | 1.77 | 6.0 |
| Comparative Example 1 | 1036 | 1.26 | 5.5 |

Referring to FIG. 3 and Table 1, it is seen that the OMC ruthenium carbon composite catalysts prepared according to Examples 1A, 2A, 3A, and 9A have similar or bigger BET surface area and similar or larger pore volumes compared to the catalyst prepared according to Comparative Example 1. Also, the OMC ruthenium carbon composite catalysts prepared according to Examples 1A, 2A, 3A, and 9A have larger average diameter of pores compared to the catalyst of Comparative Example 1.

Table 2 below lists amounts of each element measured by performing energy dispersive x-ray (EDX) analysis on the OMC composite catalysts of Examples 1A, 2A, and 3A, and Comparative Example 1, and shows atomic concentration. Table 2 shows an atomic concentration (at %). A device used for EDX analysis was a Stereoscan 440 (Leica Cambridge, England), and an average value was obtained by analyzing 3 different parts of a sample.

TABLE 2

| | Amount of N (atom %) | Amount of S (atom %) | Amount of ruthenium (atom %) | N/Ru Ratio | S/Ru Ratio |
|---|---|---|---|---|---|
| Example 1A | 5.96 | 1.25 | 1.59 | 3.75 | 0.79 |
| Example 2A | 7.04 | 1.71 | 2.33 | 3.02 | 0.73 |
| Example 3A | — | 1.55 | 1.62 | — | 0.96 |
| Comparative Example 1 | — | — | 1.52 | — | — |

Referring to Table 2, the OMC composite catalysts prepared in Examples 1A and 2A include about 5 to about 7 at % of nitrogen, but the N/Ru ratio value is lower since some of the propylene diamine used as the nitrogen-containing carbon precursor in Example 2A evaporates during carbonization. Sulfuric acid, used as the carbonization catalyst in Comparative Example 1, is completely removed during a heat treating process, and thus, both nitrogen and sulfur are not left.

Evaluation Example 1

Preparation of Half Cell 200 mg of the OMC composite catalyst of Example 1 was dissolved in 5 g of distilled water. The mixture was completely dispersed by using an ultrasonic device, and then, 5 μL of the mixture is dried at room temperature on a rotating disk electrode. 5 μL of a solution (0.05%) obtained by dispersing NAFION (manufactured by DuPont) in distilled water was dropped on the dried mixture, and then, dried at room temperature. An oxygen reduction reaction was performed with the rotation disk electrode to which the OMC composite catalyst of Example 1 was attached.

Evaluation Examples 1B-1C

Preparation of Half Cell

Fuel cells are manufactured in the same manner as Evaluation Example 1A, except that the OMC composite catalysts of Examples 1B and 1C are used instead of the OMC composite catalyst of Example 1A.

Evaluation Examples 2A-2C

Preparation of Half Cell

Fuel cells are manufactured in the same manner as Evaluation Example 1A, except that the OMC composite catalysts of Examples 2A, 2B, and 2C are used instead of the OMC composite catalyst of Example 1A.

Evaluation Examples 3A-3C

Preparation of Half Cell

Fuel cells are manufactured in the same manner as Evaluation Example 1A, except that the OMC composite catalysts of Examples 3A, 3B, and 3C are used instead of the OMC composite catalyst of Example 1A.

Evaluation Examples 4-11

Preparation of Half Cell

Fuel cells were manufactured in the same manner as Evaluation Example 1A, except that the OMC composite catalysts of Examples 4 through 11 were used instead of the OMC composite catalyst of Example 1A.

Comparative Evaluation Example 1

Preparation of Half Cell

A fuel cell was manufactured in the same manner as Evaluation Example 1, except that the OMC composite catalyst with ruthenium of Comparative Example 1 was used instead of the OMC composite catalyst of Example 1.

Figure 4:
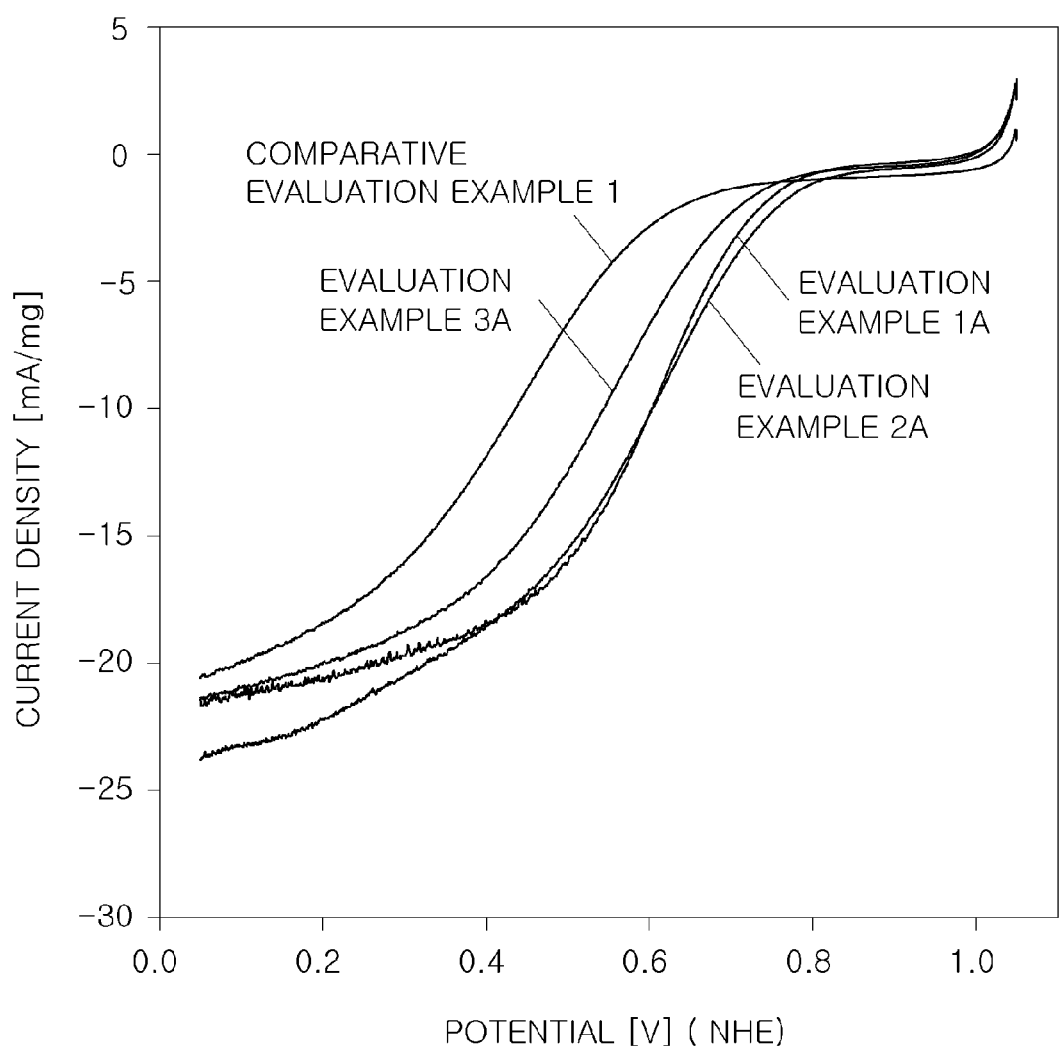
FIG. 4 is a graph showing oxygen reduction reaction (ORR) characteristics of half cells manufactured according to Evaluation Examples 1A, 2A, and 3A, and Comparative evaluation example 1.

Oxygen reduction reaction (ORR) characteristics of the half cells prepared according to Evaluation Examples 1A, 2A, and 3A and Comparative Evaluation Example 1 were measured at room temperature by saturating oxygen in a 0.1 M $HClO_4$ solution, and results thereof are illustrated in FIG. 4. Here, the ORR characteristics are evaluated according to a rotation disk electrode method in which current density values are measured in a voltage of 0.6 to 0.8 V and compared while scanning in a voltage in a range of 0 to 1.0 V at a rate of about 5 mV/s to induce oxygen reduction reaction. When an absolute value of the current density is high, the ORR performance is considered to be excellent. In FIG. 4, NHE denotes a normal hydrogen electrode. A rotation number of the rotation disk electrode is about 1600 rpm per minute.

Referring to FIG. 4, the half cells of Evaluation Examples 1A, 2A, and 3A have higher efficiency compared to the half cell of Comparative Evaluation Example 1.

Figure 5:
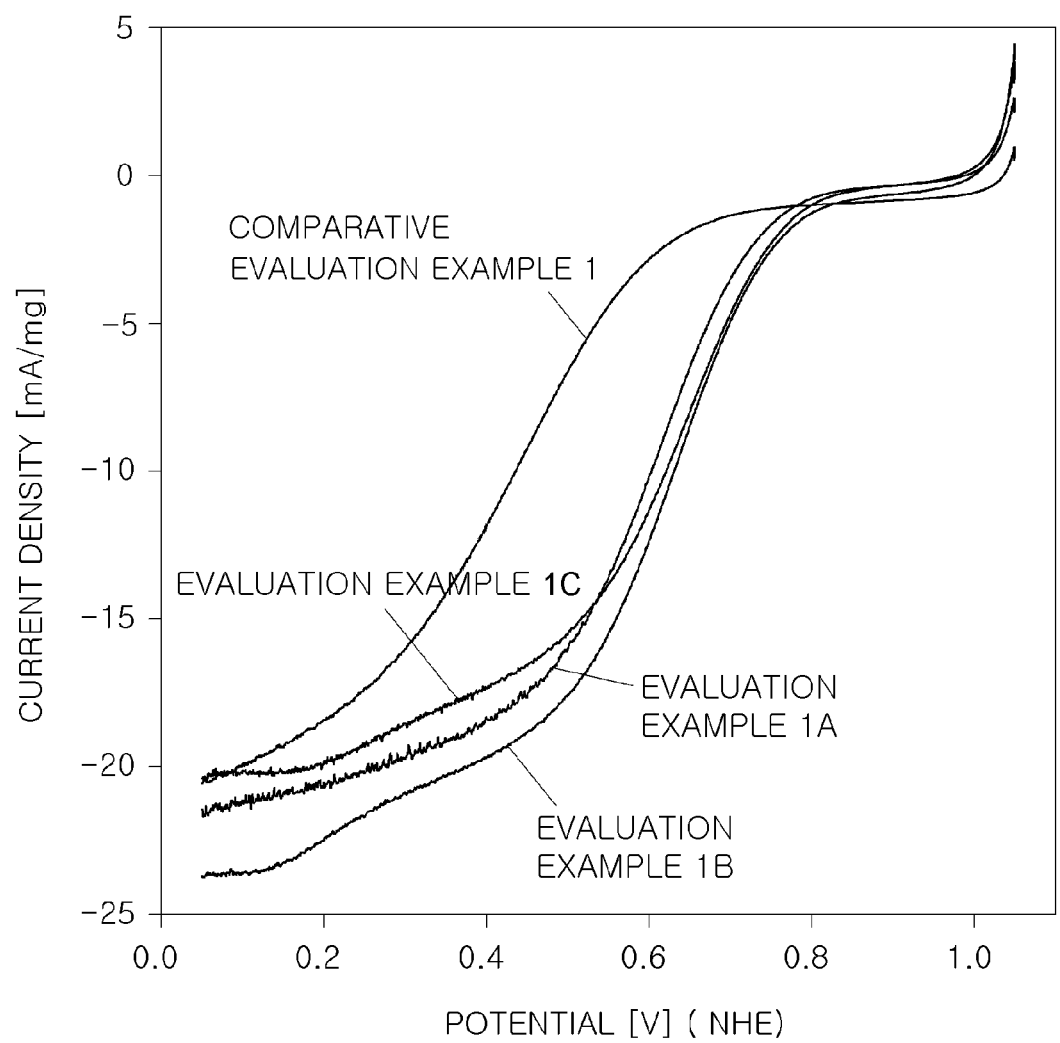
FIG. 5 is a graph showing changes of ORR characteristics in half cells manufactured according to Evaluation Example 1A, 1B, and 1C, and Comparative Evaluation Example 1.

ORR characteristics of the half cells prepared according to Evaluation Examples 1A, 1B, and 1C and Comparative Evaluation Example 1 are measured at room temperature by saturating oxygen in a 0.1 M $HClO_4$ solution, and results thereof are illustrated in FIG. 5.

Figure 6:
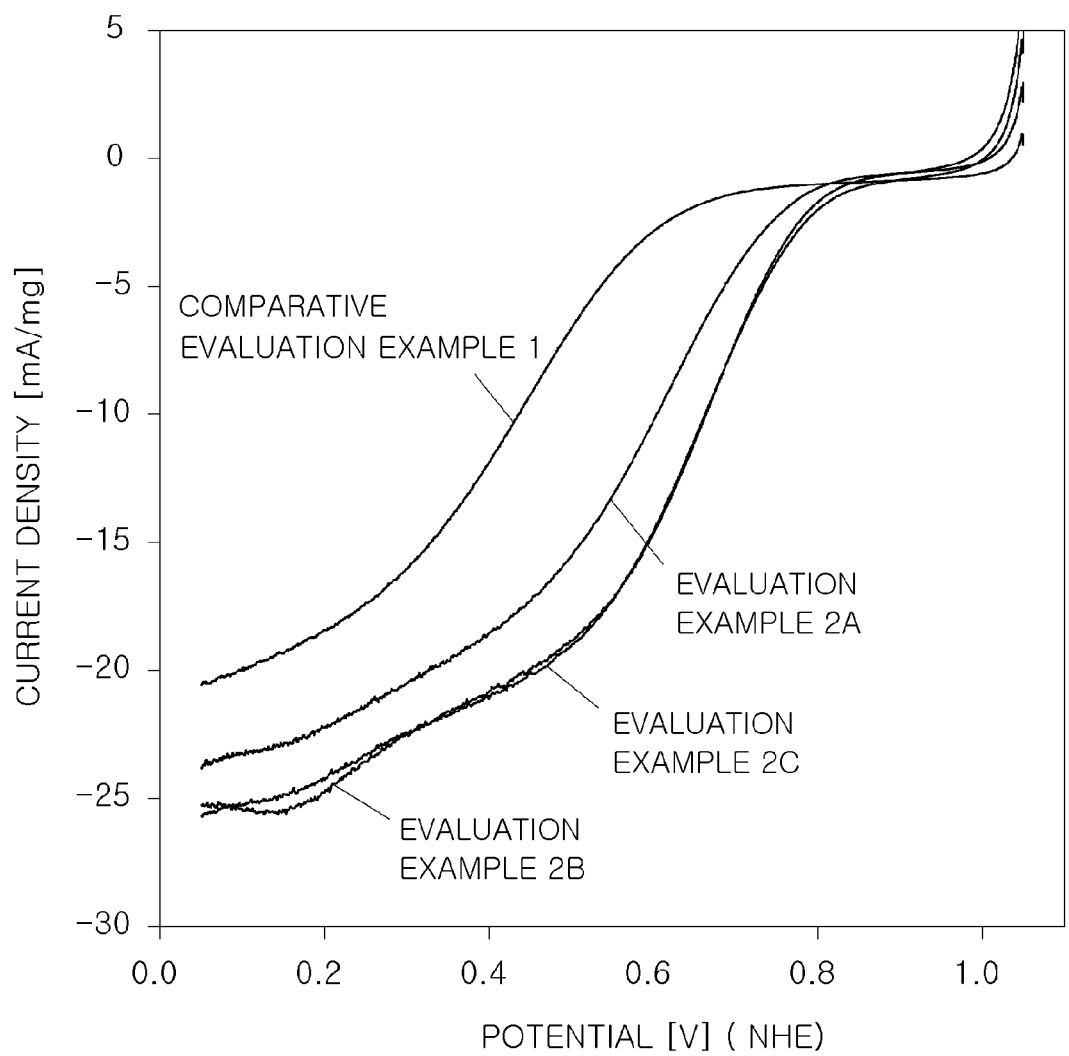
FIG. 6 is a graph showing changes of ORR characteristics in half cells manufactured according to Evaluation Examples 2A, 2B, and 2C, and Comparative Evaluation Example 1.

ORR characteristics of the half cells prepared according to Evaluation Examples 2A, 2B, and 2C and Comparative Evaluation Example 1 are measured at room temperature by saturating oxygen in a 0.1 M $HClO_4$ solution, and results thereof are illustrated in FIG. 6.

Figure 7:
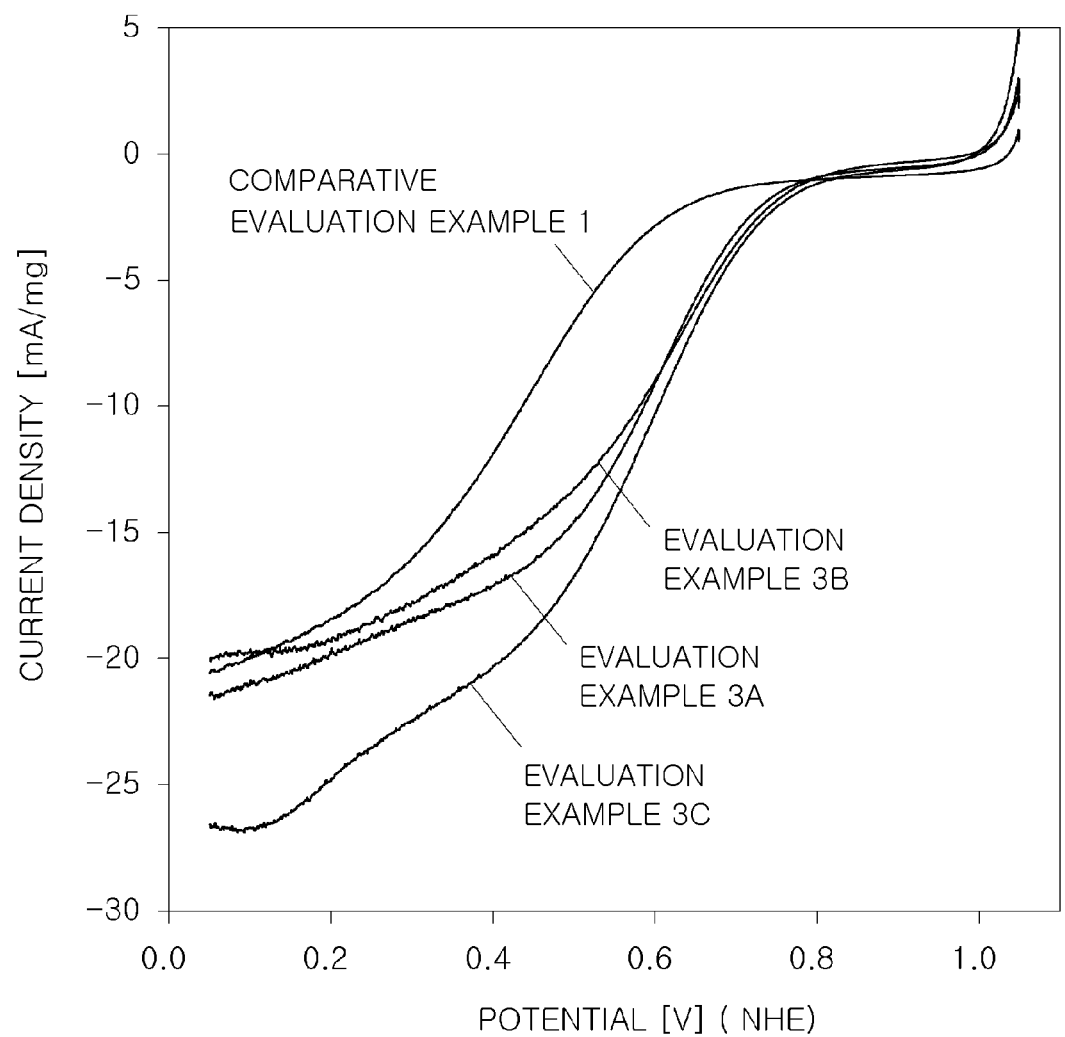
FIG. 7 is a graph showing changes of ORR characteristics in half cells manufactured according to Evaluation Example 3A, 3B, and 3C, and Comparative Evaluation Example 1.

ORR characteristics of the half cells prepared according to Evaluation Examples 3A, 3B, and 3C and Comparative Evaluation Example 1 are measured at room temperature by saturating oxygen in a 0.1 M $HClO_4$ solution, and results thereof are illustrated in FIG. 7.

The ORR characteristics of FIGS. 5 through 7 are evaluated in the same manner as in FIG. 4.

Referring to FIGS. 5 through 7, it is seen that the ORR characteristics are higher in the half cells of Evaluation Examples 1A through 1C, 2A through 2C, and 3A through 3C, compared to the half cell of Comparative Evaluation Example 1.

Figure 8:
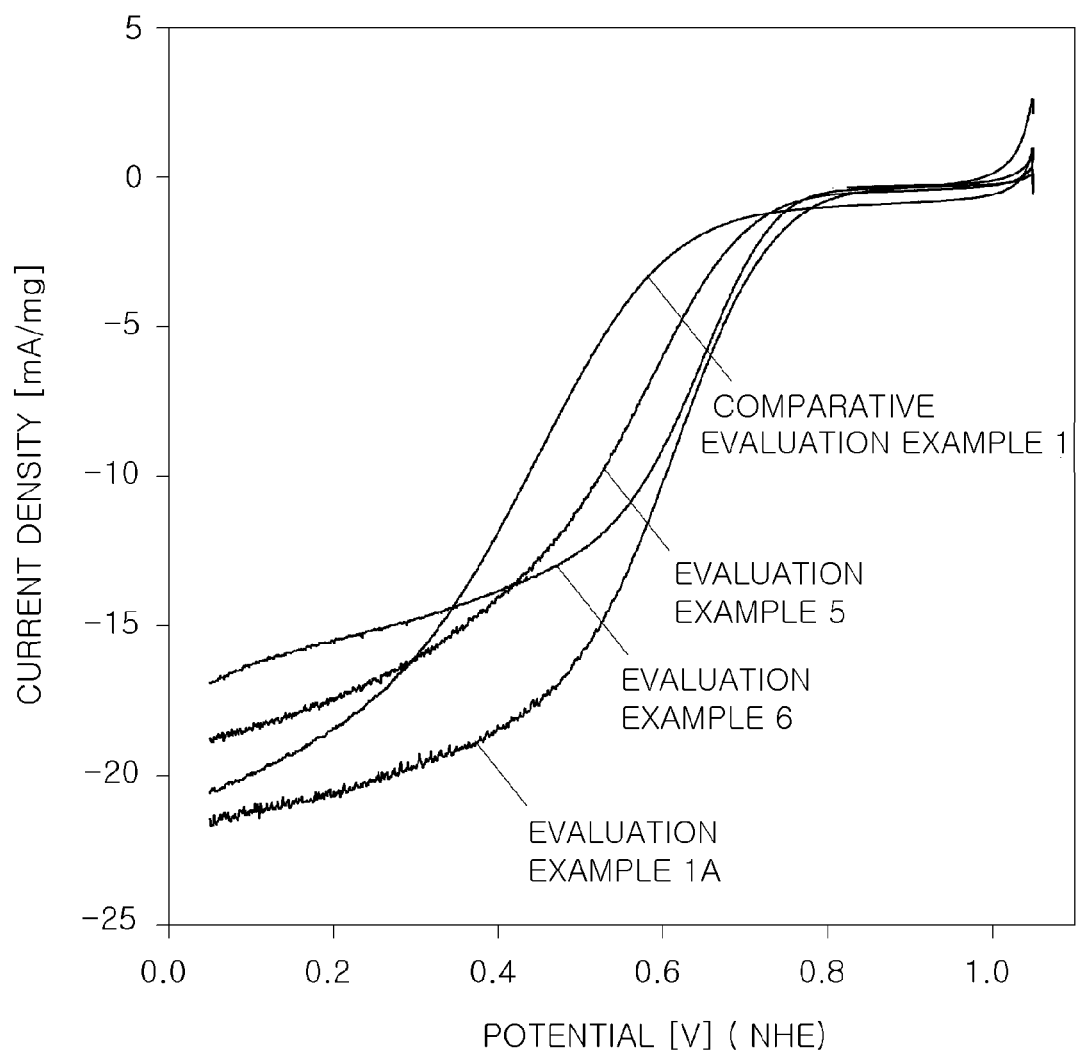
FIG. 8 is a graph showing changes of ORR performance of half cells manufactured according to Evaluation Examples 1, 5, and 6, and Comparative Evaluation Example 1.

ORR characteristics of the half cells prepared according to Evaluation Examples 1A, 5, and 6 and Comparative Evaluation Example 1 are measured at room temperature by saturating oxygen in a 0.1 M $HClO_4$ solution, and results thereof are illustrated in FIG. 8. The ORR characteristics of FIG. 8 are evaluated in the same manner as in FIG. 4.

Referring to FIG. 8, it is seen that the ORR characteristics of the half cells of Evaluation Examples 1A, 5, and 6 are excellent compared to the half cell of Comparative Evaluation Example 1.

Figure 9:
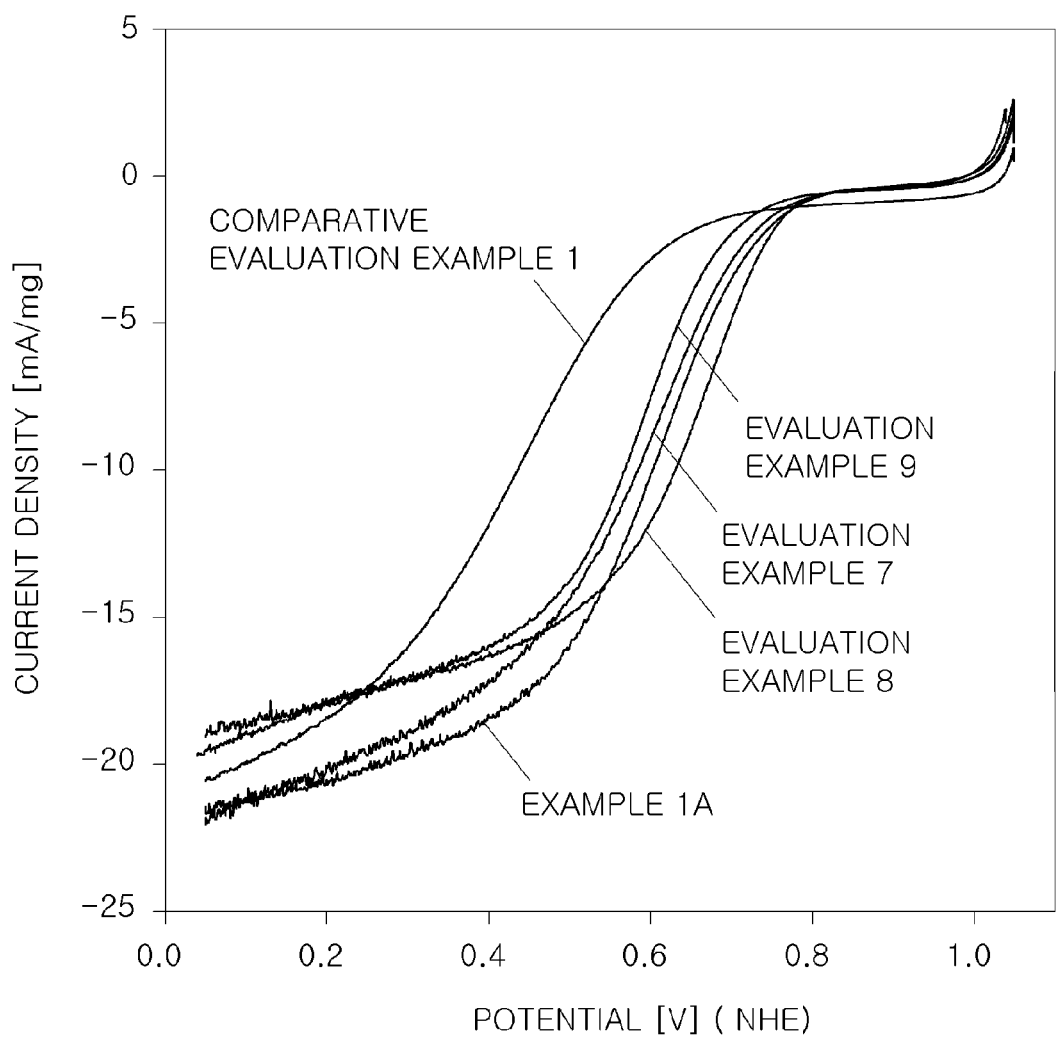
FIG. 9 is a graph showing changes or ORR performance of half cells manufactured according to Evaluation Examples 1A, and 7 through 9, and Comparative Evaluation Example 1.

ORR characteristics of the half cells prepared according to Evaluation Examples 1A, and 7 through 9 and Comparative Evaluation Example 1 are measured at room temperature by saturating oxygen in a 0.1 M $HClO_4$ solution, and results thereof are illustrated in FIG. 9. The ORR characteristics of FIG. 9 are evaluated in the same manner as in FIG. 4.

Referring to FIG. 9, it is seen that the ORR characteristics of the half cells of Evaluation Examples 1A, and 7 through 9 are excellent compared to the half cell of Comparative Evaluation Example 1.

As described above, according to the one or more of the above embodiments, the catalyst activity of the OMC composite catalyst with respect to oxygen reduction is improved compared to conventional OMC catalysts. By using the OMC composite catalyst, a fuel cell having an excellent oxygen reduction reaction is manufactured.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An ordered mesoporous carbon (OMC) composite catalyst, comprising:
   an OMC; and
   metal particles and at least one component selected from a group consisting of nitrogen (N) and sulfur (S) uniformly dispersed in the OMC, wherein the nitrogen-containing component is derived from at least one selected from the group consisting of quinoxaline, propylene diamine, 4,4-dipyridyl and phenanthroline.

2. The OMC composite catalyst of claim 1, wherein the metal of the metal particles is at least one selected from the group consisting of ruthenium, palladium, iridium, iron, cobalt, molybdenum, and nickel.

3. The OMC composite catalyst of claim 1, wherein the amount of metal particles is about 0.05 to about 0.45 parts by weight based on 1 part by weight of the OMC.

4. The OMC composite catalyst of claim 1, wherein the OMC has mesopores having an average diameter of about 6 to about 10 nm.

5. The OMC composite catalyst of claim 1, wherein an average particle diameter of the metal particles is about 1 to about 50 nm.

6. The OMC composite catalyst of claim 1, wherein the amount of the component is about 0.005 to about 0.1 parts by weight based on 1 part by weight of the OMC.

7. The OMC composite catalyst of claim 1, wherein the component includes both nitrogen and sulfur, and a mixed atomic ratio of nitrogen to sulfur is from about 1:3 to about 9:1.

8. The OMC composite catalyst of claim 1, wherein a major peak of Bragg's 2θ angle to CuK-alpha characteristic X-ray wavelength 1.541 Å is located between about 0.5° and about 1.2°.

9. A method of manufacturing a carbon composite catalyst, the method comprising:
   impregnating an ordered mesoporous silica (OMS) with a mixture of at least one selected from the group consisting of a nitrogen-containing carbon precursor, and sulfur-containing carbon precursor, a metal precursor, and a solvent;
   drying and heat-treating the impregnated OMS;
   carbonizing the dried and heat-treated OMS to obtain a carbon-OMS composite; and
   removing the OMS from the carbon-OMS composite to obtain the carbon composite catalyst, wherein the carbon composite catalyst comprises:
      an ordered mesoporous carbon (OMC) composite, and
      metal particles and at least one component selected from a group consisting of nitrogen (N) and sulfur (S) uniformly dispersed in the OMC, and
   wherein the nitrogen-containing carbon precursor is derived from at least one compound selected from a group consisting of quinoxaline, propylene diamine, 4,4-dipyridyl and phenanthroline.

10. The method of claim 9, wherein the sulfur-containing carbon precursor is para-toluene sulfonic acid.

11. The method of claim 9, wherein the metal precursor is at least one selected from a group consisting of ruthenium chloride, molybdenum chloride, iron chloride, and cobalt chloride.

12. The method of claim 9, wherein the amount of the sulfur-containing carbon precursor is about 30 to about 90 parts by weight based on 100 parts by weight of the nitrogen-containing carbon precursor.

13. The method of claim 9, wherein the amount of the metal precursor is about 20 to about 120 parts by weight based on 100 parts by weight of the nitrogen-containing carbon precursor.

14. A fuel cell comprising:
   a cathode;
   an anode; and
   an electrolyte disposed between the cathode and the anode,
   wherein at least one of the cathode and the anode comprises an ordered mesoporous carbon (OMC) composite catalyst, comprising:
      an OMC; and
      metal particles and at least one component selected from a group consisting of nitrogen (N) and sulfur (S) uniformly dispersed in the OMC, and
   wherein the nitrogen-containing component is derived from at least one selected from the group consisting of quinoxaline, propylene diamine, 4,4-dipyridyl and phenanthroline.

15. The fuel cell of claim 14, wherein the metal particles are at least one selected from a group consisting of ruthenium, palladium, iridium, iron, cobalt, molybdenum, and nickel.

16. The fuel cell of claim 14, wherein the amount of metal particles is about 0.05 to about 0.45 parts by weight based on 1 part by weight of the OMC.

17. The fuel cell of claim 14, wherein the mesopores have an average diameter of about 6 to about 10 nm.

18. The fuel cell of claim 14, wherein the amount of the component is about 0.005 to about 0.1 parts by weight based on 1 part by weight of the OMC.

19. The fuel cell of claim 14, wherein the component includes both nitrogen and sulfur, and a mixed atomic ratio of nitrogen to sulfur is from about 1:3 to about 9:1.

20. The OMC composite catalyst of claim 1, wherein the OMC composite catalyst is:
   an OMC composite catalyst (Ru—N—S-OMC) including OMC and Ruthenium (Ru) and nitrogen (N) and sulfur (S) uniformly dispersed in the OMC;
   an OMC composite catalyst (Ru—S-OMC) including OMC, and Ruthenium (Ru) and sulfur (S) uniformly dispersed in the OMC;
   an OMC composite catalyst (Ru—N-OMC) including OMC, and Ruthenium (Ru) and Nitrogen (N) uniformly dispersed in the OMC;

an OMC composite catalyst (Mo—N—S-OMC) including OMC, and molybdenum (Mo) and nitrogen (N) and sulfur (S) uniformly dispersed in the OMC;

an OMC composite catalyst (Fe—N—S-OMC) including OMC, and iron (Fe) and nitrogen (N) and sulfur (S) uniformly dispersed in the OMC;

an OMC composite catalyst (Co—N—S-OMC) including OMC, and Cobalt (Co) and nitrogen (N) and sulfur (S) uniformly dispersed in the OMC;

an OMC composite catalyst (RuFe—N—S-OMC) including OMC, and ruthenium (Ru) and iron (Fe) and nitrogen (N) and sulfur (S) uniformly dispersed in the OMC; or an OMC composite catalyst (RuCo—N—S-OMC) including OMC, and ruthenium (Ru) and Cobalt (Co) and nitrogen (N) and sulfur (S) uniformly dispersed in the OMC.

21. The fuel cell of claim 14, wherein the OMC composite catalyst is an OMC composite catalyst (Ru—N—S-OMC) including OMC and Ruthenium (Ru) and nitrogen (N) and sulfur (S) uniformly dispersed in the OMC;

an OMC composite catalyst (Ru—S-OMC) including OMC, and Ruthenium (Ru) and sulfur (S) uniformly dispersed in the OMC;

an OMC composite catalyst (Ru—N-OMC) including OMC, and Ruthenium (Ru) and Nitrogen (N) uniformly dispersed in the OMC;

an OMC composite catalyst (Mo—N—S-OMC) including OMC, and molybdenum (Mo) and nitrogen (N) and sulfur (S) uniformly dispersed in the OMC;

an OMC composite catalyst (Fe—N—S-OMC) including OMC, and iron (Fe) and nitrogen (N) and sulfur (S) dispersed in the OMC;

an OMC composite catalyst (Co—N—S-OMC) including OMC, and Cobalt (Co) and nitrogen (N) and sulfur (S) uniformly dispersed in the OMC;

an OMC composite catalyst (RuFe—N—S-OMC) including OMC, and ruthenium (Ru) and iron (Fe) and nitrogen (N) and sulfur (S) uniformly dispersed in the OMC; or an OMC composite catalyst (RuCoN—S-OMC) including OMC, and ruthenium (Ru) and Cobalt (Co) and nitrogen (N) and sulfur (S) uniformly dispersed in the OMC.

* * * * *